(12) United States Patent
Sharrah et al.

(10) Patent No.: US 11,548,705 B1
(45) Date of Patent: Jan. 10, 2023

(54) LOCKING STORAGE BOX WITH QUICK-ACCESS FEATURES

(71) Applicant: Streamlight, Inc., Eagleville, PA (US)

(72) Inventors: Jonathan R. Sharrah, Phoenixville, PA (US); Joshua D. Hawk, Limerick, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 17/574,765

(22) Filed: Jan. 13, 2022

(51) Int. Cl.
| | | |
|---|---|---|
| *B65D 55/14* | (2006.01) | |
| *B65D 43/16* | (2006.01) | |
| *B65D 53/02* | (2006.01) | |
| *F21V 33/00* | (2006.01) | |
| *H02J 50/10* | (2016.01) | |
| *B65D 25/28* | (2006.01) | |
| *H02J 7/00* | (2006.01) | |
| *B65D 43/22* | (2006.01) | |
| *F41C 33/06* | (2006.01) | |
| *F41G 1/35* | (2006.01) | |

(52) U.S. Cl.
CPC ......... *B65D 55/14* (2013.01); *B65D 25/2885* (2013.01); *B65D 43/165* (2013.01); *B65D 43/22* (2013.01); *B65D 53/02* (2013.01); *F21V 33/0004* (2013.01); *H02J 7/0044* (2013.01); *H02J 50/10* (2016.02); *F41C 33/06* (2013.01); *F41G 1/35* (2013.01)

(58) Field of Classification Search
CPC .. B65D 55/14; B65D 25/2885; B65D 43/165; B65D 43/22; B65D 53/02; H02J 50/10; F21V 33/0004; F41C 33/06; F41G 1/35

USPC .......................................... 220/830; 362/154
See application file for complete search history.

(56) References Cited

U.S. PATENT DOCUMENTS

| | | | | |
|---|---|---|---|---|
| 2003/0000955 | A1* | 1/2003 | Lee ...................... | A23B 7/0425 220/848 |
| 2011/0098058 | A1* | 4/2011 | Mahalingam ...... | G06Q 30/0603 455/456.1 |
| 2012/0262618 | A1* | 10/2012 | Weakly ............... | H04N 5/2252 348/E5.022 |
| 2014/0311390 | A1* | 10/2014 | Blankenship ........... | E05B 65/52 109/59 R |
| 2015/0369529 | A1* | 12/2015 | Monroe .................... | F25D 3/08 62/457.2 |
| 2016/0123701 | A1* | 5/2016 | Ho ........................... | E05C 9/02 70/63 |
| 2016/0186465 | A1* | 6/2016 | Nelson ................ | E05B 65/0075 220/230 |
| 2017/0233155 | A1* | 8/2017 | Daws, II ................ | B65D 43/16 220/324 |
| 2018/0097214 | A1* | 4/2018 | Ogawa ................. | H05K 5/0221 |
| 2018/0186531 | A1* | 7/2018 | McBride ................ | B65D 55/14 |
| 2019/0085595 | A1* | 3/2019 | Ervin ..................... | E05B 37/16 |
| 2022/0090874 | A1 | 3/2022 | Ervin | |

OTHER PUBLICATIONS

Stopbox USA [https://stopboxusa.com/products/stopbox] retrieved on Dec. 20, 2021 (14 pages).

\* cited by examiner

*Primary Examiner* — J. Gregory Pickett
*Assistant Examiner* — Niki M Eloshway
(74) *Attorney, Agent, or Firm* — Quarles & Brady LLP; James J. Aquilina

(57) ABSTRACT

A storage box having a locking assembly with quick-access features and an optional passthrough charging port is shown and described.

22 Claims, 11 Drawing Sheets

LOCKING STORAGE BOX WITH QUICK-ACCESS FEATURES

FIELD OF THE DISCLOSURE

The present disclosure relates to the field of locking storage enclosures, and more particularly to a locking storage box having quick-access features.

BACKGROUND

Firearm-mountable lights and other accessories that are mountable to a firearm but that require occasional recharging are well known in the art. Examples include the TLR series of firearm-mountable lights manufactured and sold by Streamlight, Inc. of Eagleville, Pa., U.S.A., which is the applicant of the present application. Removal of these items from a firearm for recharging purposes is labor-intensive and time-consuming. At the same time, many firearm owners will desire to safely store their firearms while they are not in use. Typical safes, moreover, are slow to access, and may not be suitable for instances in which quick access to a firearm is desirable. Further, typical safes lack internal charging features.

Therefore, there is a need for a locking storage box with passthrough charging features that allows for secure storage of items requiring charging therein, while also allowing for quick access to the interior of the box.

BRIEF DESCRIPTION OF THE DRAWINGS

The devices according to the present disclosure are further described with reference to the accompanying drawings, in which.

SUMMARY OF THE INVENTIVE CONCEPTS

Figure 1:
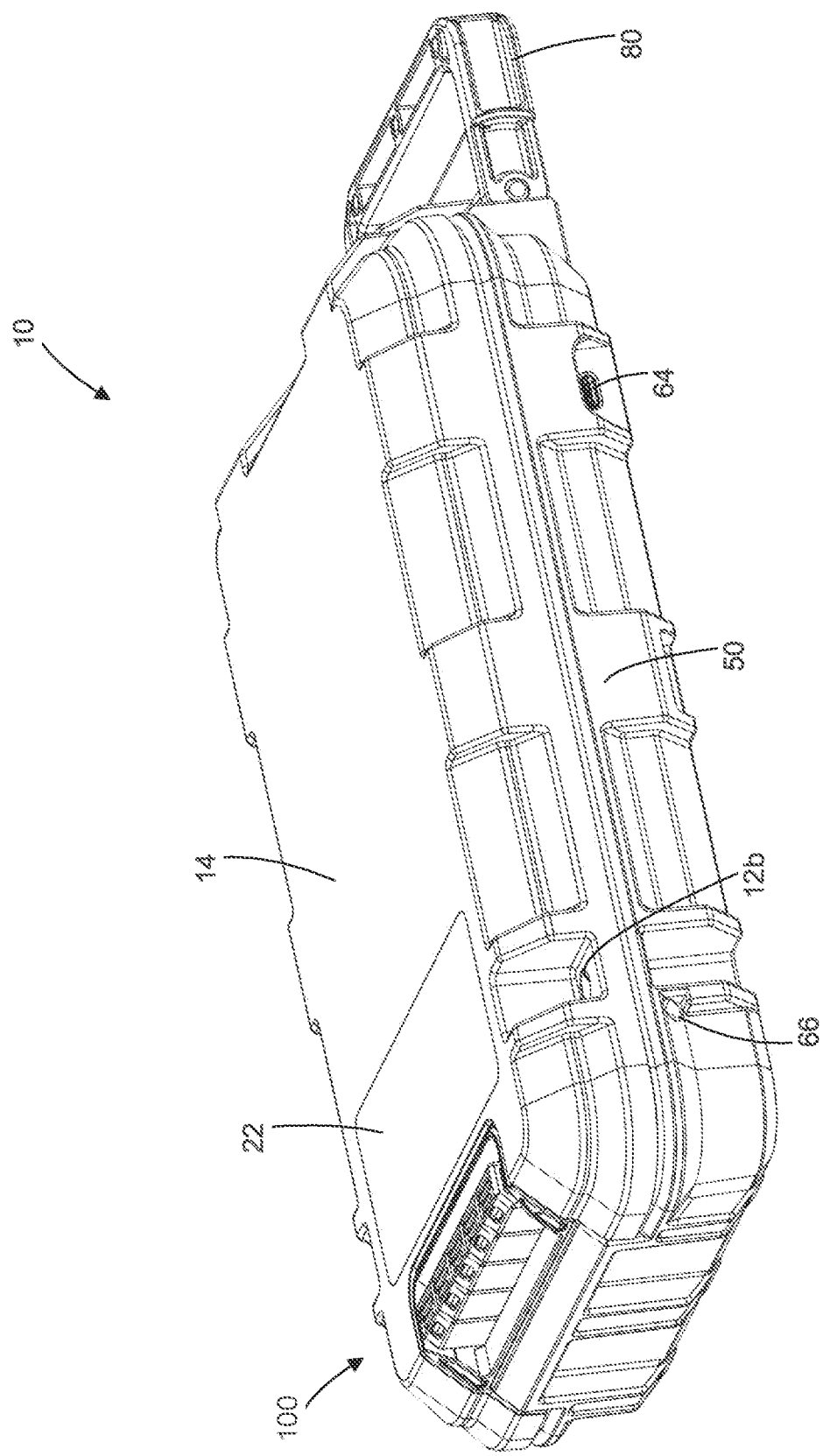
FIG. 1 is a top perspective view of a first embodiment of a storage box according to the present disclosure.

In one respect, the inventive concept is an enclosure, the enclosure comprising: a main body; a lid; and a locking assembly that is releasably engageable between the main body and the lid, the locking assembly having a locked configuration in which the lid and the main body are secured together and an unlocked configuration in which the lid is separable from the main body, the main body and the lid forming a storage compartment therebetween when the main body and the lid are mated together, the locking assembly comprising a plurality of buttons, each of the plurality of buttons being individually depressible, each of the plurality of buttons being individually includable or excludable from an unlock combination of the locking assembly, wherein when all of the buttons of the plurality of buttons which are included in the unlock combination are simultaneously depressed without any of the buttons of the plurality of buttons which are excluded from the unlock combination being simultaneously depressed, the locking assembly is placed into its unlocked configuration.

In another respect, the inventive concept is an enclosure, the enclosure comprising: a main body; a lid; and a locking assembly that is releasably engageable between the main body and the lid, the locking assembly comprising a plurality of buttons, each of the plurality of buttons having a first pin hole and a second pin hole, each of the plurality of buttons being individually depressible, a plurality of locking pins, each of the plurality of locking pins being selectably installable in either of the first pin hole or the second pin hole of a respective one of the buttons of the plurality of buttons, wherein installation of a respective one of the locking pins into the respective first pin hole of a respective one of the buttons includes said button in an unlock combination of the locking assembly and wherein installation of said respective one of the locking pins into the respective second pin hole of said respective one of the buttons excludes said button from the unlock combination, a pin plate comprising a plurality of upper pin slots and a plurality of lower pin slots, each of the upper pin slots corresponding with a location of a respective first pin hole of a button of the plurality of buttons and each of the lower pin slots corresponding with a location of a respective second pin hole of a button of the plurality of buttons, wherein when all of the buttons of the plurality of buttons which are included in the unlock combination are simultaneously depressed without any of the buttons of the plurality of buttons which are excluded from the unlock combination being simultaneously depressed, the plurality of locking pins press on the pin plate and cause it to be temporarily relocated such that the lid is separable from the main body.

In yet another respect, the inventive concept is an enclosure comprising: a main body; a lid; a locking assembly that is releasably engageable between the main body and the lid, the locking assembly having a locked configuration in which the lid and the main body are secured together and an unlocked configuration in which the lid is separable from the main body, the main body and the lid forming a storage compartment therebetween when the main body and the lid are mated together; and an electrical passthrough that extends from an exterior of the enclosure into the storage compartment, the electrical passthrough comprising a charging and/or data port.

DETAILED DESCRIPTION

The ensuing detailed description provides exemplary embodiment(s) only, and is not intended to limit the scope, applicability, or configuration of the herein disclosed embodiment(s). Rather, the ensuing detailed description of the exemplary embodiment(s) will provide those skilled in the art with an enabling description for implementing the exemplary embodiments in accordance with the present disclosure. It should be understood that various changes may be made in the function and arrangement of elements without departing from the spirit and scope of the invention, as set forth in the appended claims.

To aid in describing the disclosure and/or invention as claimed, directional terms may be used in the specification and claims to describe portions of the present disclosure and/or invention (e.g., upper, lower, left, right, etc.). These directional definitions are merely intended to assist in describing the embodiment(s) and claiming the invention, and are not intended to limit the disclosure or claimed invention in any way. In addition, reference numerals that are introduced in the specification in association with a drawing figure may be repeated in one or more subsequent figures without additional description in the specification, in order to provide context for other features.

It should be understood that when an element is referred to as being "connected" or "coupled" to another element, it can be directly connected or coupled to the other element or that intervening elements may be present. In contrast, when an element is referred to as being "directly connected" or "directly coupled" to another element, it should be understood that no intervening elements are present. Other words used to describe the relationship between elements should be interpreted in a like fashion (e.g., "between" versus "directly between," "adjacent" versus "directly adjacent," etc.).

In embodiment(s) described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiment(s) may be combined to form further embodiment(s). For example, variations or modifications described with respect to one of the embodiment(s) may also be applicable to other embodiment(s), unless noted to the contrary.

Firearm-mountable lights and other accessories that are mountable to a firearm but that require occasional recharging are well known in the art. Removal of these items from a firearm for recharging purposes is labor-intensive and time-consuming. At the same time, many firearm owners will desire to safely store their firearms while they are not in use. However, typical safes lack internal charging features. Typical safes and secure enclosures, moreover, are slow to access, and may not be suitable for instances in which quick access to a firearm is desirable. Trigger locks are likewise slow to remove, and are therefore unsuitable for such situations.

The inventors of the present application have therefore conceived of and developed a locking storage box (i.e., enclosure) that allows for quick access to the interior of the storage box. The quick access features of the storage box are achieved through an adjustable locking assembly comprising multiple depressible buttons that may be either included or excluded from the unlock combination via internal reconfiguration of threaded fasteners. In some embodiments, moreover, the storage box includes passthrough charging features that allow for secure storage of items requiring charging therein. The quick-access features of the storage box make it a suitable storage container for every day-use items, such as jewelry, cash, wallets, and other valuables. In the present embodiments, the locking storage box is sized to fit a typical pistol, in its holster and with an attached light. It should be understood that the locking storage box according to the present disclosure could be provided in any suitable size, for example to store longer, taller, and/or wider items, for example rifles and shotguns.

In the present embodiments, the action on the buttons will feel the same to a user whether the button is included in or excluded from the unlock combination, which prevents discovery of the unlock combination through lock tampering. Further, in these embodiments the locking assembly will automatically default to its locked configuration when the buttons are undepressed. These features will be further described below in detail.

Figure 2:
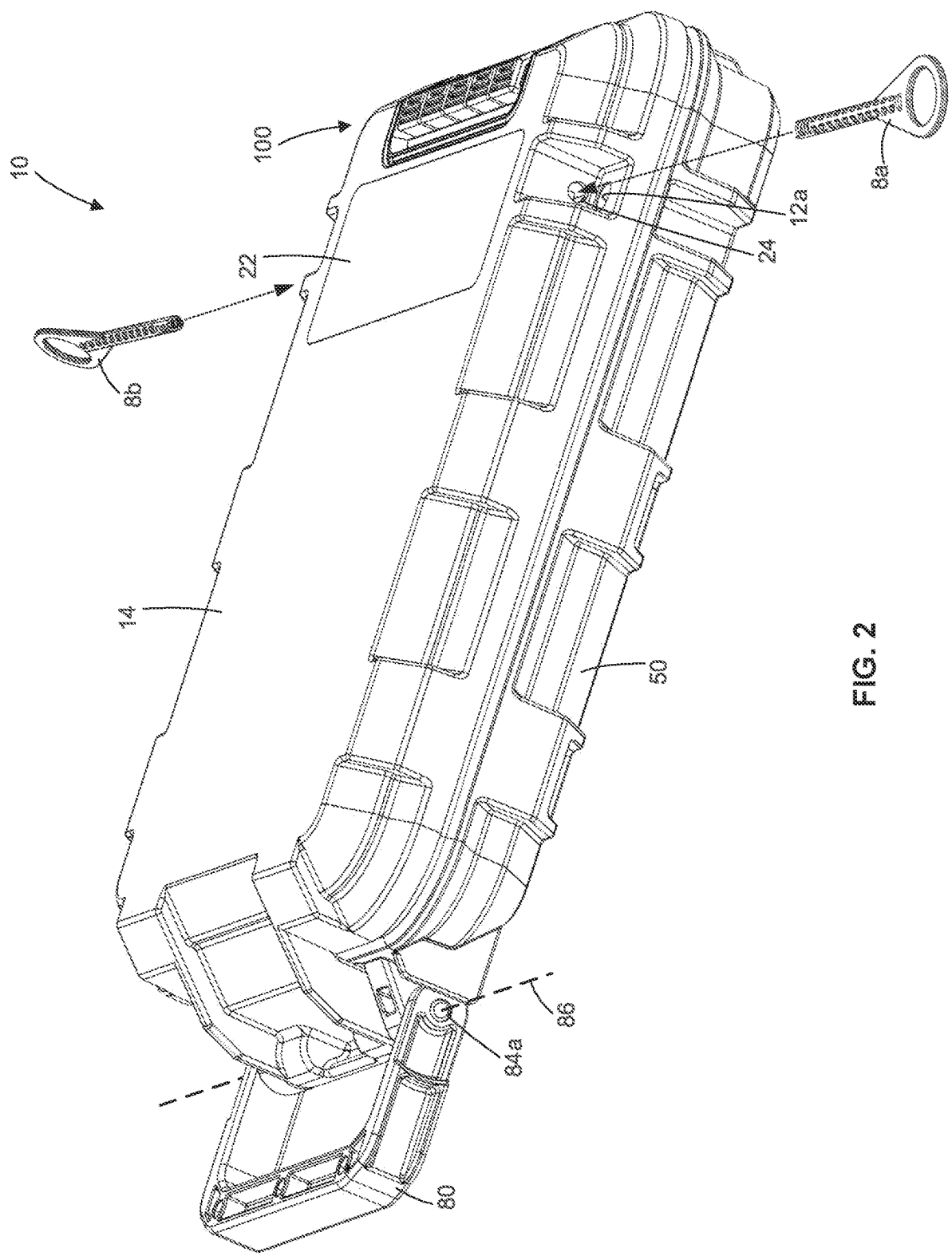
FIG. 2 is another top perspective view thereof.
Figure 3:
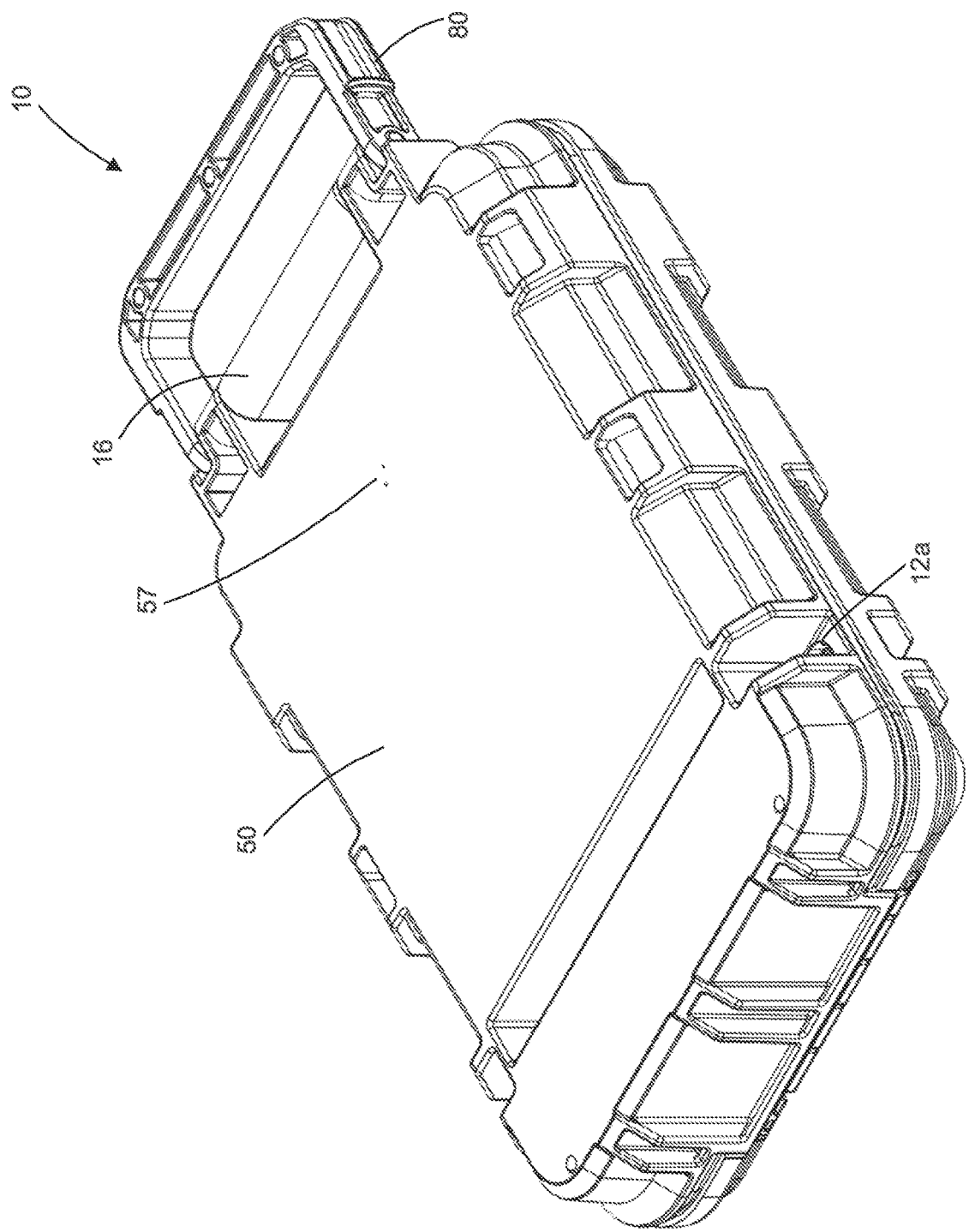
FIG. 3 is a bottom perspective view thereof.

Referring now generally to FIGS. 1-10, one embodiment of a storage box 10 according to the present disclosure will be described in detail. FIGS. 1-3 show various perspective views of the exterior of the storage box 10 according to the present disclosure. In this embodiment, the storage box 10 comprises a top lid 14, a bottom lid 50 which serves as a main body of the storage box 10, a handle 80 for carrying the storage box 10, and a locking assembly 100.

Figure 4:
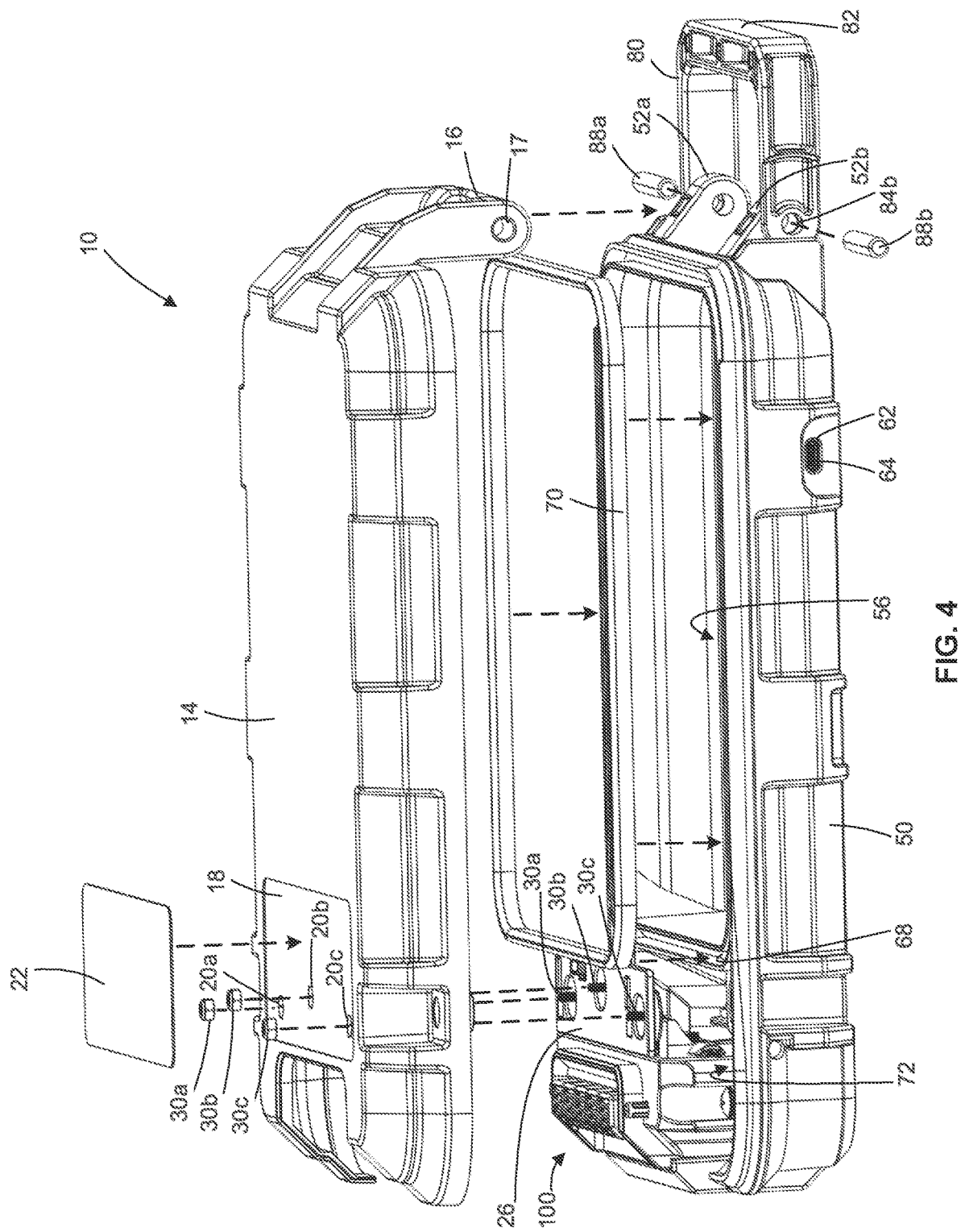
FIG. 4 is a partial exploded view thereof, showing the lid, handle, and storage compartment construction.
Figure 5:
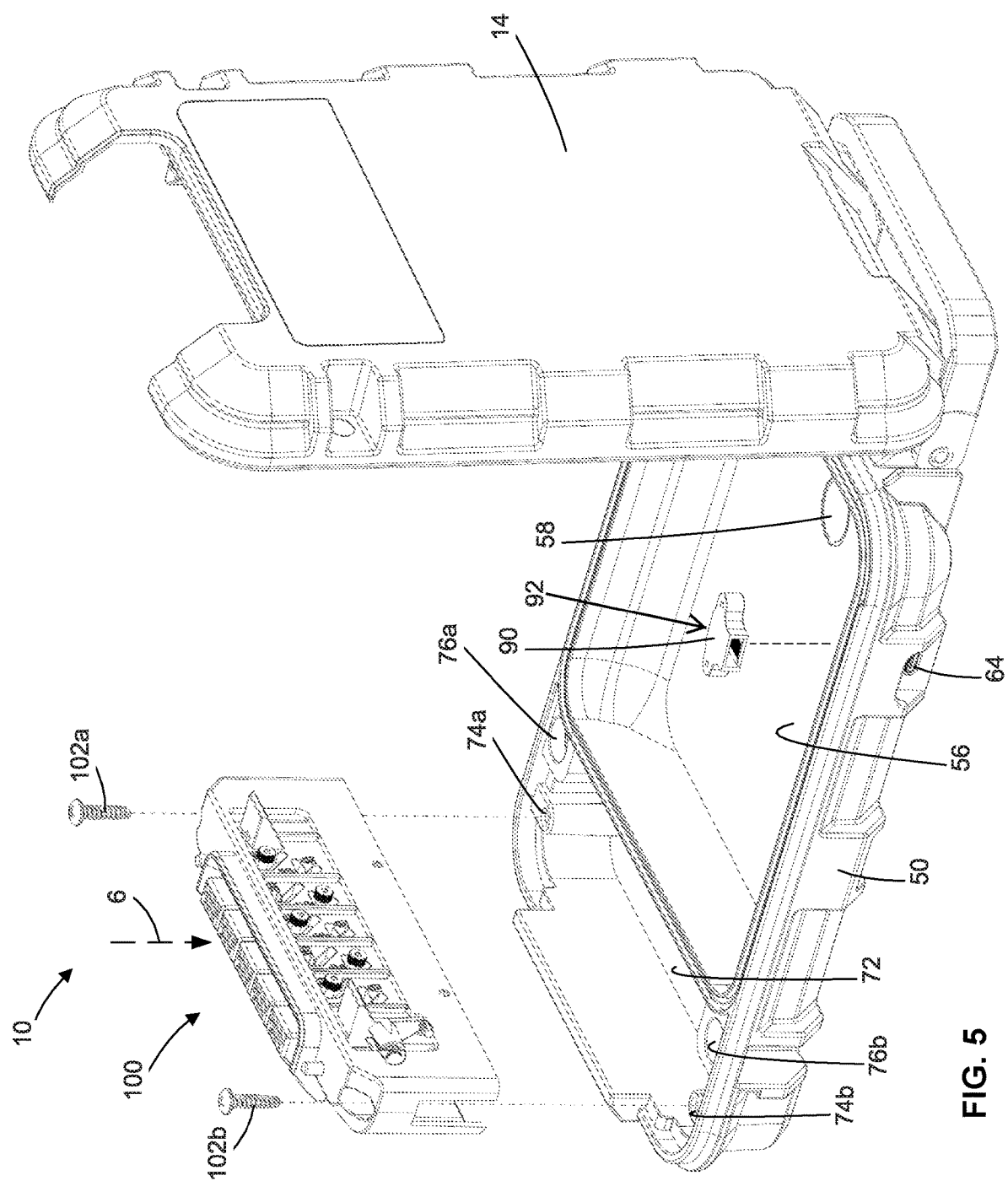
FIG. 5 is another partial exploded view of the storage box of FIG. 1, showing the top lid in an open configuration and the locking assembly of the storage box removed from its mounting space within the bottom lid thereof.
Figure 8:
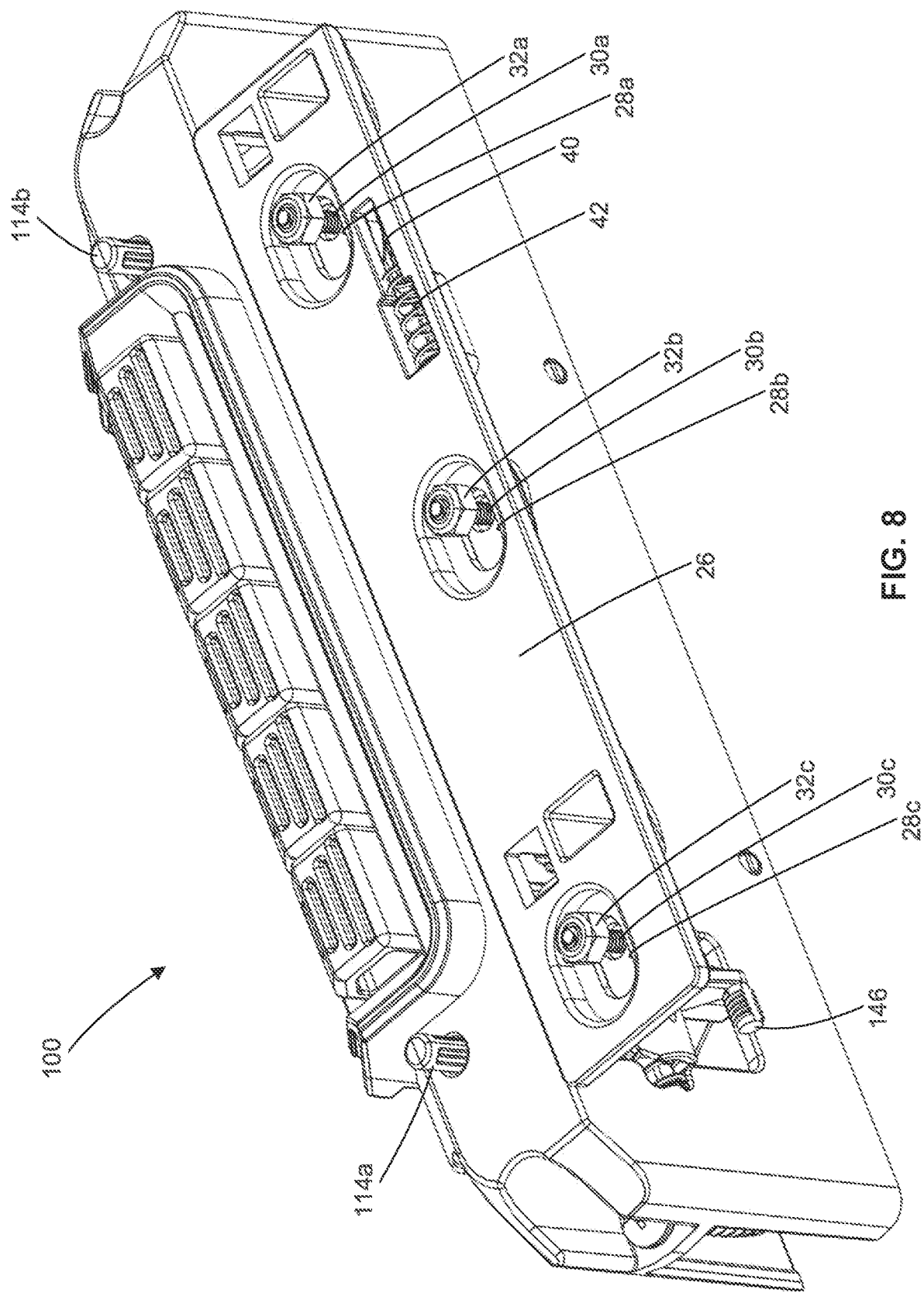
FIGS. 8 and 9 are perspective views of the locking assembly in connection with a locking plate that acts to selectably secure and release the top lid in connection with the bottom lid.
Figure 9:
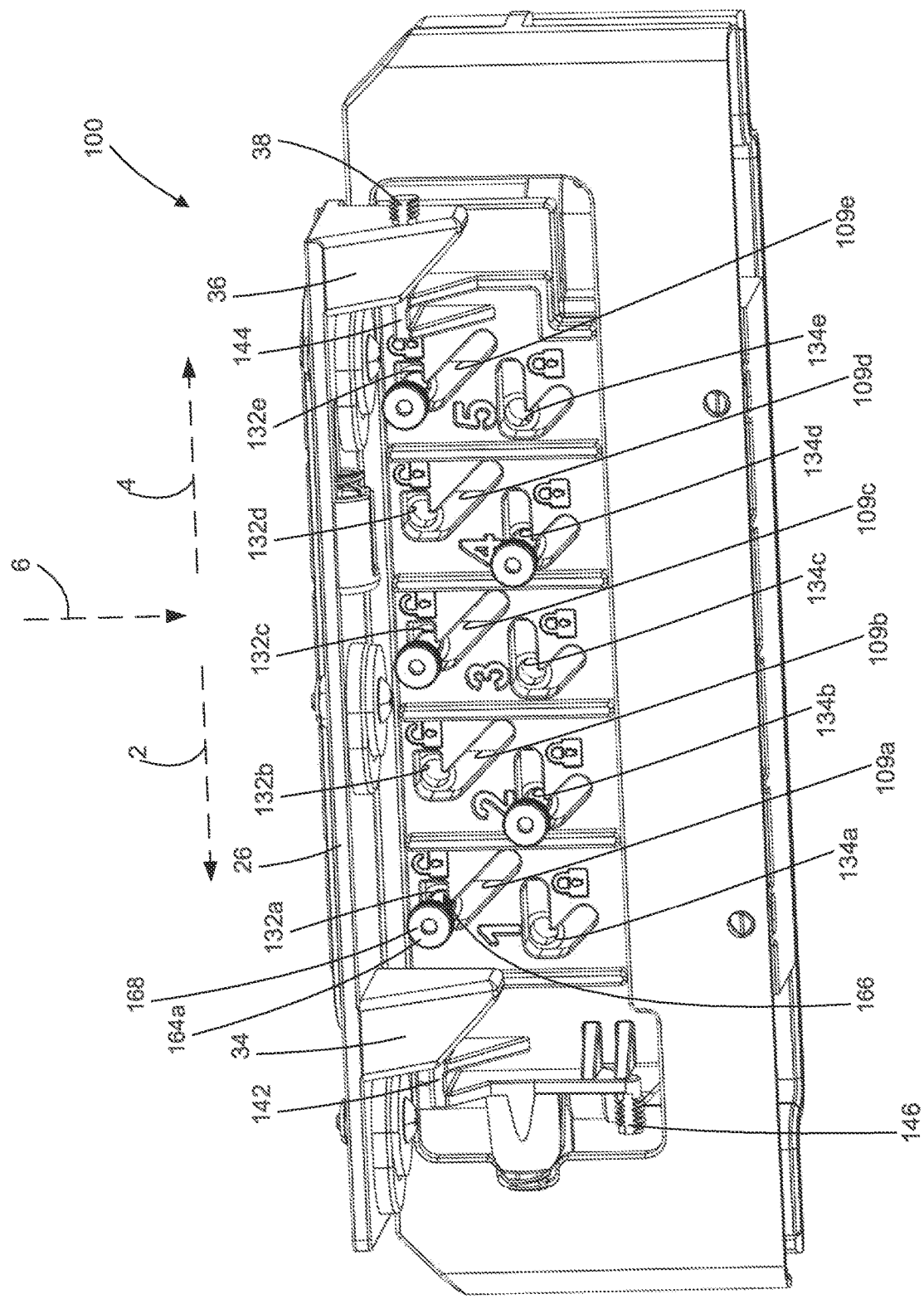

In this embodiment, the top lid 14 comprises a name plate 22 on which the user can write or imprint their name or other identifying information. As shown in FIG. 4, the name plate 22 sits within a space 18 located in the top lid 14 and conceals holes 20a-20c into which nuts 32a-32c are placed. In this embodiment the holes 20a-20c each have a hexagonal cross-sectional and are sized just larger than each of a respective one of the nuts 32a-32c—which in this embodiment are also hexagonal in shape—so that each of the nuts 32a-32c is secured in a fixed rotational position in a respective one of the holes 20a-20c. As shown in FIGS. 4, 8, and 9, a locking plate 26 is fixedly secured to the underside of the top lid 14. As will be described below in detail, the locking plate 26 interacts with the locking assembly 100 to allow for the top lid 14 and bottom lid 50 to be alternatively fixed together and released so that the interior of the storage box 10 may be accessed.

The locking plate 26 is secured to the underside of the top lid 14 via passage of each of a respective one of fasteners 30a-30c through a respective one of washers 31a-31c, a respective one of holes 28a-28c located in the locking plate 26, and into a respective one of the nuts 32a-32c. Since each of the nuts 32a-32c is secured in a fixed rotational position in a respective one of the holes 20a-20c, the fasteners 30a-30c may be tightened into a respective one of the nuts 32a-32c from an underside of the top lid 14 without need to support the nuts 32a-32c during the tightening process. As will be further described below, each of the holes 28a-28c in the locking plate 26 has an elongated, oval shape to allow for lateral shifting of the locking plate 26.

In this embodiment, the top lid 14 has an access hole 24 and the bottom lid 50 has an access hole 66, each of which is positioned for insertion of a lock override key into the interior of the storage box 10, for times when manual override of the locking assembly 100 is necessary. A first lock override key 8a may be routed through the access hole 24 in the top lid 14 and threadedly attached to a threaded portion 38 located on the locking plate 26, and a second lock override key 8b may be routed through the access hole 66 in the bottom lid 50 and threadedly attached to a threaded portion 146 located on a pin plate 140 of the locking assembly 100. When pulled in opposing outward directions, the lock override keys 8a,8b manually shift the locking plate 26 and pin plate 140 so that respective locking tabs thereon—as will be further described below in detail—disengage from each other and allow the top lid 14 to be removed from the bottom lid 50, thus granting access to a storage compartment 56 formed by the lids 14,50 inside the storage box 10 when the lids 14,50 are mated together in a closed configuration. The locking plate 26 further comprises a slot 40 containing a spring 42 therein, the spring 42 acting to bias the locking plate 26 in a direction to the left (i.e., in a direction 2) as shown in FIG. 9.

In this embodiment, the top lid 14, bottom lid 50, and handle 80 are rotatably attached together about a rotation axis 86 in a hinged fashion, which allows for the top lid 14 to be rotated away from the bottom lid 50 when the locking assembly 100 is disengaged, and for the handle 80 to be freely rotatable about the rotation axis 86 independent of both of the lids 14,50. The handle 80 includes a carrying portion 82 that may be used for carrying or relocating the storage box 10. In this embodiment, the top lid 14 comprises a knuckle 16 having a pin hole 17, the bottom lid 50 has a pair of knuckles 52a,52b, each having a pin hole (not labeled), and the handle 80 includes a pair of pin holes 84a,84b. The handle 80 and lids 14,50 are attached together by press-fitting a first pin 88a through the pin hole 84a in the handle 80, the pin hole in the knuckle 52a, and into the pin hole 17 in the knuckle 16, and by press-fitting a second pin 88b through the pin hole 84b in the handle 80, the pin hole in the knuckle 52b, and into the pin hole 17 in the knuckle 16. In alternative embodiments according to the present disclosure, the lids 14,50 and the handle 80 may be connected together by other means and/or the handle 80 may be omitted entirely.

In this embodiment, the storage box 10 further comprises a pair of locking holes 12a,12b—which each include aligned holes on each of the top lid 14 and bottom lid 50 (see holes labeled 76a,76b in FIG. 5)—through which a padlock or other secondary and/or tertiary lock can be routed, to prevent undesired access to the interior of the storage box 10. These locking holes 12a,12b may be used to render the storage box 10 TSA-compliant, for when the user desires to transport a firearm in the storage box 10 on an airplane.

As noted above, the storage compartment 56 is formed by the top lid 14 and bottom lid 50 being mated together. In some embodiments according to the present disclosure, the storage compartment 56 of the storage box 10 could be fitted with light(s)—for example, one or more LEDs—that either automatically switch on when the top lid 14 is removed from the bottom lid 50 via a wired pressure switch, or that can be manually turned on and off via either an internal or external switch. In some embodiments, the light(s) in the storage compartment may be configured to automatically turn off after a predetermined period of time (e.g., 30, 60, or 120 seconds) after being turned on.

In this embodiment, the bottom lid 50 comprises a gasket slot 68 into which a gasket 70 is fit, to render the storage compartment 56 liquidproof (e.g., waterproof) when the lids 14,50 are mated or locked together. In this way, the storage compartment 56 may be configured to meet one or more known waterproof test standards, for example IPX4, IPX5, IPX6, IPX7, and/or IPX8 standards, as established by the International Electrotechnical Commission. In the embodiments shown in the figures, the bottom lid 50 further comprises a liquid-impermeable but gas-permeable sealing vent 58 located on the bottom surface thereof. FIG. 3 shows three small holes (though only one hole 57 is labeled) that are routed through the bottom lid 50 into the storage compartment 56. In this embodiment, the sealing vent 58 (see FIG. 4) is placed over these holes (including hole 57) to maintain the sealed, waterproof environment of the storage compartment 56 while allowing the storage compartment 56 to equalize pressure with the external environment without causing damage to the gasket 70 or any object stored within the storage compartment 56. In this embodiment, the sealing vent 58 is comprised of an expanded polytetrafluoroethylene (ePTFE) membrane that allows continuous pressure equalization within the storage compartment 56 while the gasket 70 is providing a waterproof seal therein while the top lid 14 and bottom lid 50 are secured together. W. L. Gore & Associates, Inc. of Newark, Del., United States produces vent seals that are suitable for use as the sealing vent 58. In alternative embodiments, other known or hereafter-discovered membranous materials may be used in place of ePTFE to form the sealing vent 58, including materials formed in different shapes. For example, in further alternative embodiments, the sealing vent 58 may be replaced with one or more rods formed of PTFE or other materials, which help achieve water-resistant pressure equalization within the storage compartment 56, thus minimizing or preventing vacuum lock when the storage box 10 is transported between different environments or altitudes. POREX Corporation of Fairburn, Ga., United States produces suitable rod-shaped PTFE vents that may be used with various embodiments of the storage box 10, as would be appreciated by persons having ordinary skill in the relevant art.

Figure 10:
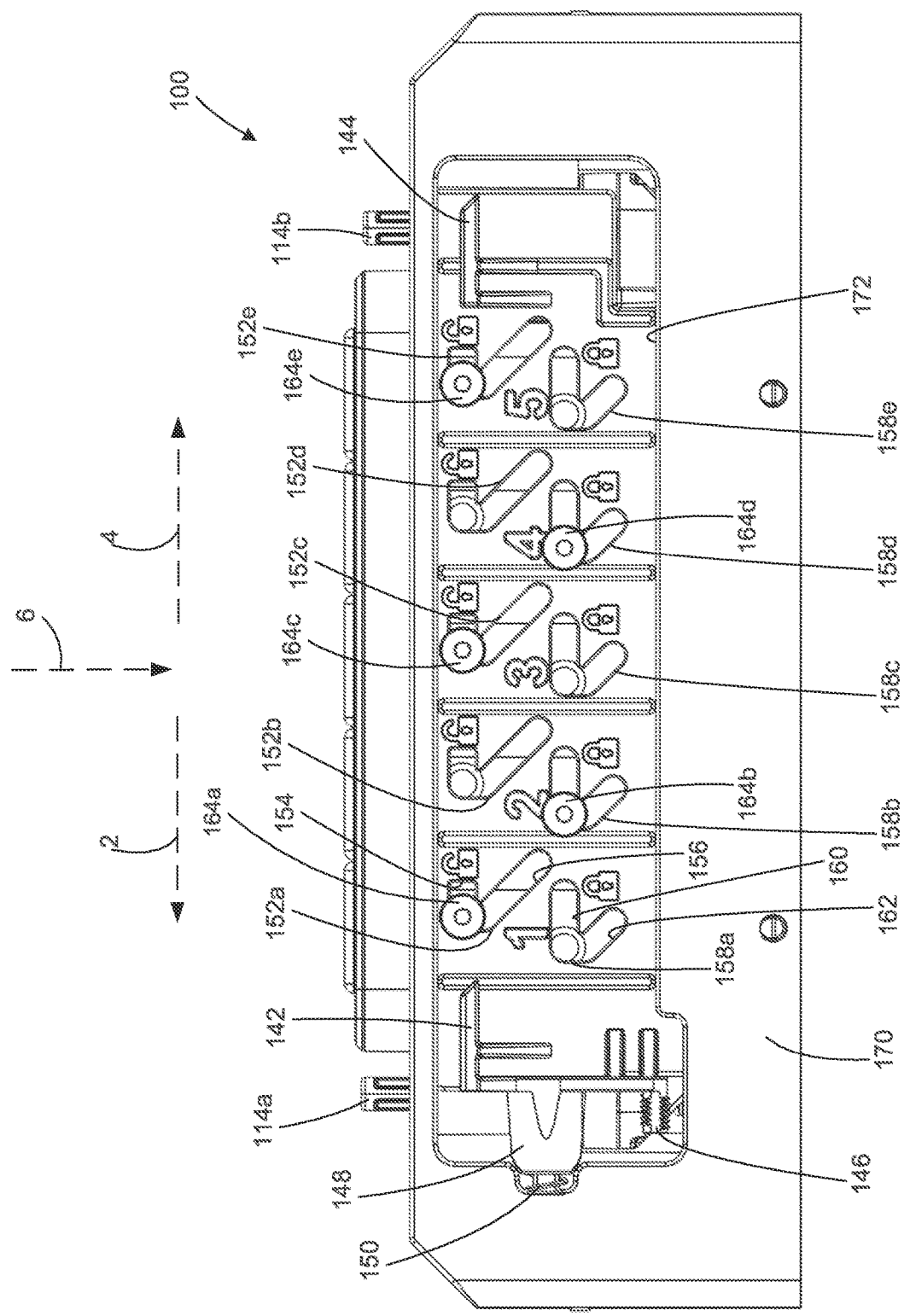
FIG. 10 is an interior side view of the locking assembly, showing the locking pins and pin plate thereof.
Figure 11:
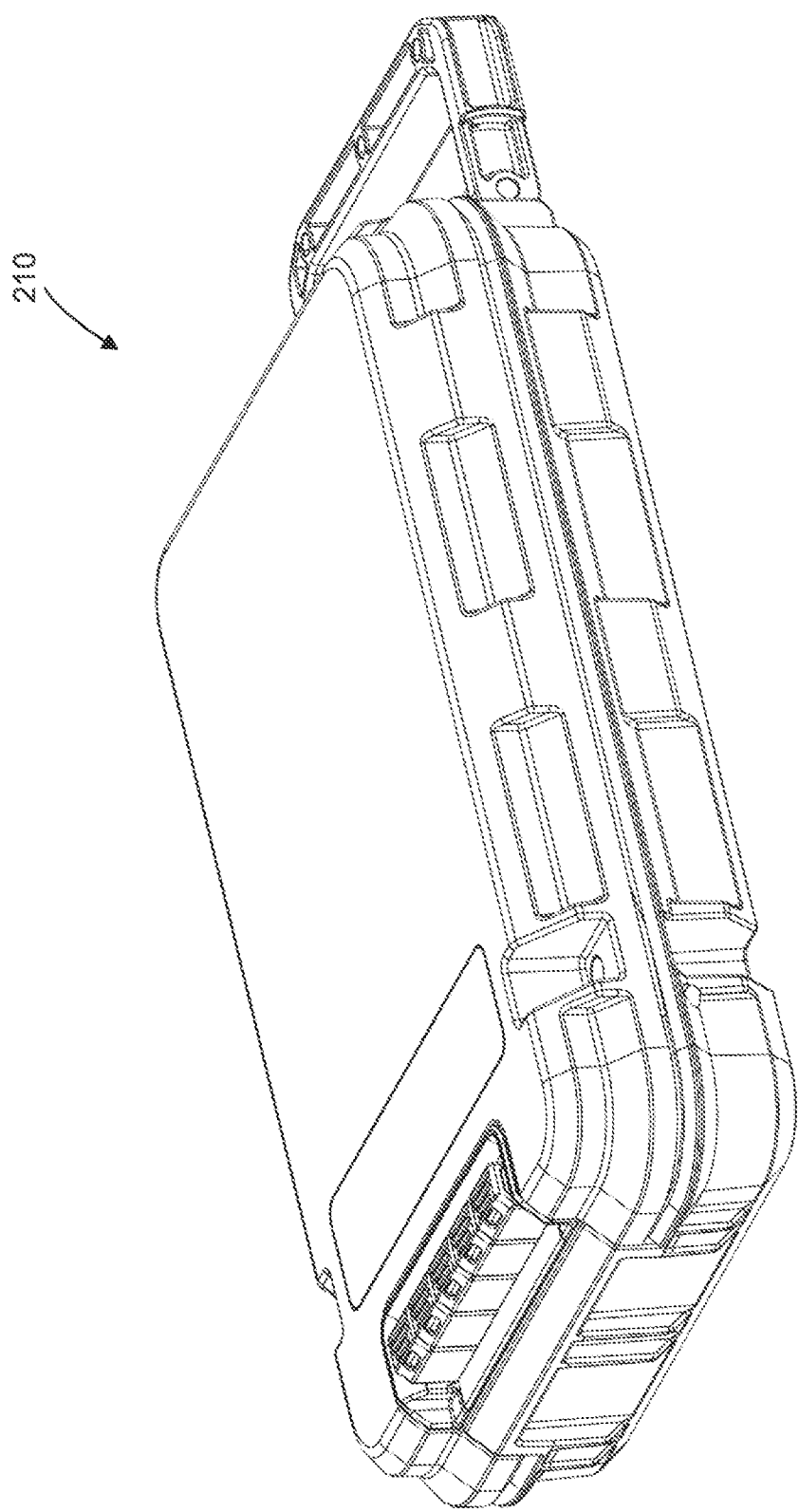
FIG. 11 is a top perspective view of a second embodiment of a storage box according to the present disclosure.

As noted above, in this embodiment, one feature of the storage box 10 is the ability to charge or transmit data to or from the interior of the storage box 10 while the locking assembly 100 is engaged, to prevent the need for removal of, e.g., firearm accessories such as lights or red dot sights from firearms while they are being charged while maintaining the firearm in a secure container. In this embodiment, the bottom lid 50 comprises a passthrough 62—essentially, an opening in a sidewall of the bottom lid 50—in which a charging port 64 is installed. The storage box 10 thus includes the passthrough 62 extending between an exterior of the storage box 10 into the storage compartment 56. As shown in the partial exploded view of FIG. 5, a housing 90 is installed interior to the storage compartment 56, and the housing 90 contains another charging port 92, with a data cable, ribbon, or other type of connection (not labeled) located within the housing 90 and connected to the two charging ports. In this embodiment, both charging ports are USB-C female connectors, but in alternative embodiments the data/charging ports may be of any other type in any combination, whether male or female, or replaced with any suitable combination of fixed or permanent cable as an alternative to the housing 90. In further alternative embodiments, a storage and charging cradle for removable, rechargeable batteries could be provided inside the storage box 10, and/or a wireless charger (e.g., Qi-type) could be separately provided within or fixedly built into the storage box 10. In further alternative embodiments according to the present disclosure, the passthrough 62 could be omitted entirely, and the storage box 10 could be provided without any means to allow for charging of internally-stored items when the locking assembly 100 is engaged. An embodiment of a storage box 210 according to the present disclosure that lacks a passthrough is shown in FIG. 11. This embodiment of the storage box 210 is otherwise substantively identical to the embodiment of the storage box 10 shown in FIGS. 1-10. In further alternative embodiments, the storage compartment 56 could be provided with a physical punch-out or other means for a manufacturer or user to retrofit the storage box 10 to include a charging port, passthrough-cable, or other electronics, if they so desire.

Referring back to the embodiment of FIGS. 1-10, the bottom lid 50 comprises a space 72 for insertion of the locking assembly 100 therein. The space 72 is separate from the storage compartment 56. The space 72 comprises a pair of bores 74a,74b with internal threading for receipt of a respective one of a pair of fasteners 102a,102b therein, which are used to secure the locking assembly 100 to the bottom lid 50.

Figure 6:
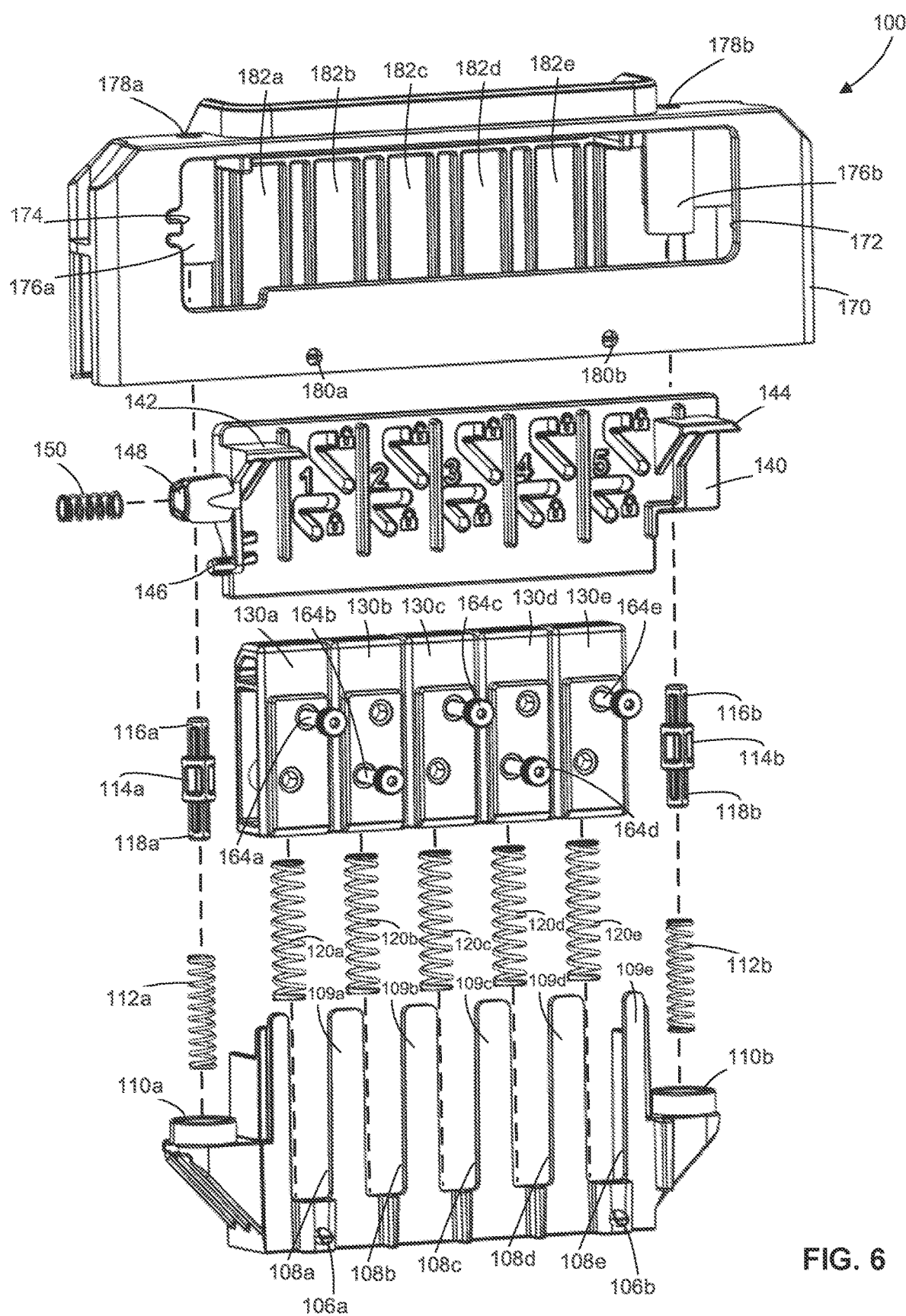
FIG. 6 is an exploded view of the locking assembly.
Figure 7:
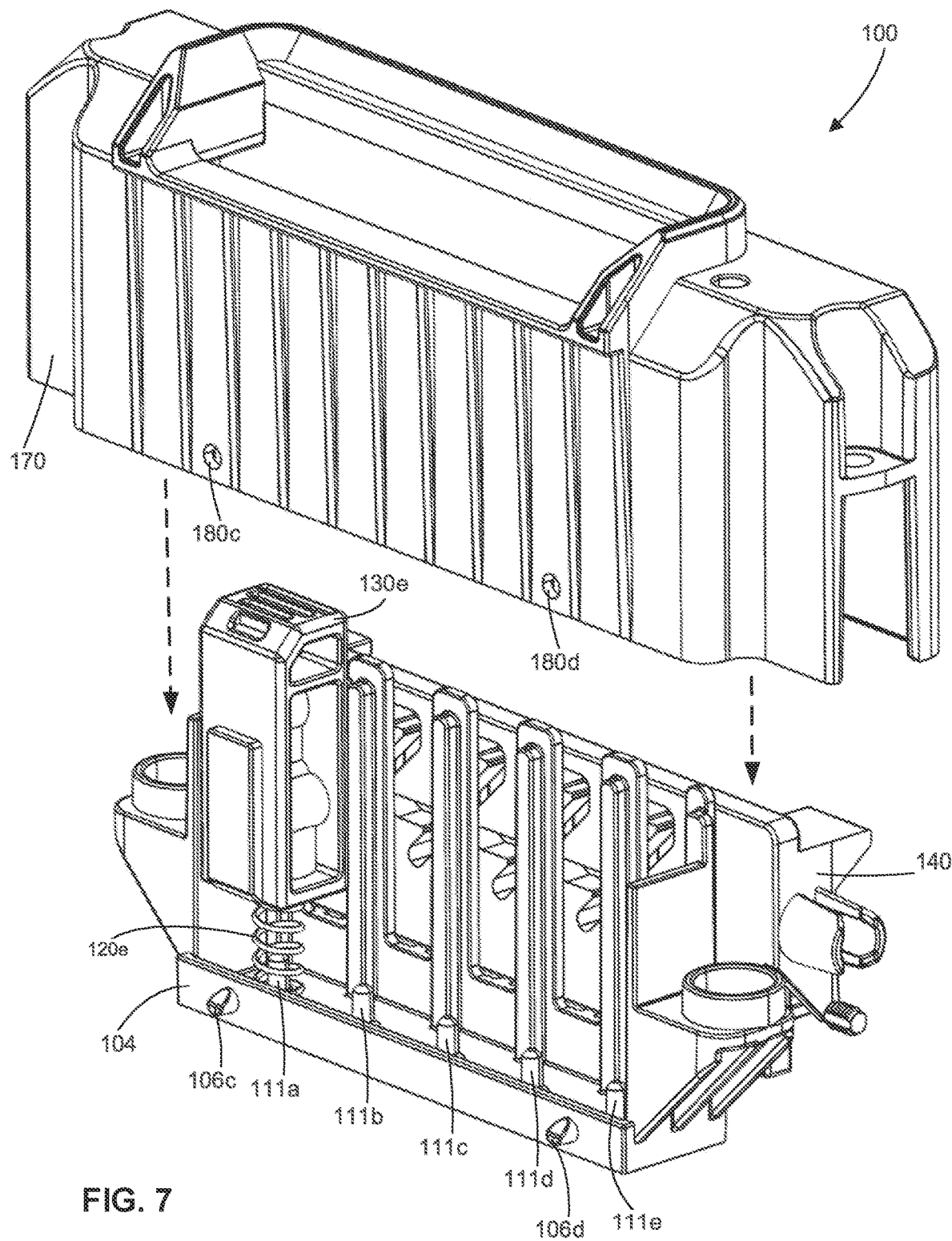
FIG. 7 is a partially-exploded view of portions of the locking assembly.

With reference now to FIGS. 6-10, the structure and functionality of the locking assembly 100 will now be described in detail. In this embodiment, the locking assembly 100 comprises a button housing 104 that fits within and is secured to an outer housing 170 via, in part, insertion of tabs 106a-106d located on the button housing 104 into appropriately sized holes 180a-180d located on both side of the outer housing 170. With reference to FIGS. 6 and 7, each of the tabs 106a-106d has an upper, ramped surface (not separately labeled) that allows for the button housing 104 to be installed upwardly into the bottom side of the outer housing 170, such that the tabs 106a-106d cause the button housing 104 to slightly deform inwardly until each of the tabs 106a-106d is fully aligned with a respective one of the holes 180a-180d, such that the tabs 106a-106d snap into the holes 180a-180d, thus holding all of the parts of the locking assembly 100 together without the need for any internal fasteners. This embodiment of the locking assembly 100, therefore, is constructed without the use of any internal fasteners.

In this embodiment, the button housing 104 includes a pair of spring holders 110a,110b located on respective sides thereof, and the outer housing 170 includes a pair of bores 176a,176b formed therein. When the locking assembly 100 is fully assembled, the spring holder 110a and bore 176a hold the release spring 112a therein, and the spring holder 110b and bore 176b hold the release spring 112b therein. A respective lower portion 118a,118b of each of a pair of lid release pins 114a,114b sits within the interior of the respective lid release spring 112a,112b, and a respective upper portion 116a,116b of each of the lid release pins 112a,112b extends through a respective one of a pair of holes 178a, 178b formed in the top of the outer housing 170, each of which is located at the top end of a respective one of the bores 176a,176b. The upper portions 116a,116b of each of the lid release pins 112a,112b are sized just smaller than the holes 178a,178b.

The lid release pins 112a, 112b are biased upwardly due to the compressed state of the lid release springs 112a,112b within the assembled locking assembly 100, and thereby act to assist in separation of the top lid 14 from the bottom lid 50 once the locking assembly 100 has been disengaged from the locking plate 26. This additional lift-assist function helps to overcome the adhesive forces created by the gasket 70 when the top lid 14 and bottom lid 50 have been compressed together. In alternative embodiments according to the present disclosure, the lift-assist function could be structured differently or omitted entirely from the storage box 10.

In this embodiment, the button housing 104 further comprises a plurality of slots 108a-108e located therein, which act to form a plurality of dividers 109a-109e. The plurality of slots 108a-108e allow for installation and removal of a respective one of a plurality of locking pins 164a-164e into a respective one of a plurality of buttons 130a-130e, which is done—as will be explained below in further detail—to set the unlock combination for the locking assembly 100, while also providing clearance for the locking pins 164a-164e while the buttons 130a-130e are being depressed. In this embodiment, five buttons 130a-130e and a matching number of locking pins 164a-164e are provided as part of the locking assembly 100, but in alternative embodiments according to the present disclosure this number could be varied, for example any number of buttons between 3-10 (for up to two-handed simultaneous depression of buttons used as an unlock combination), or any number greater than 10. In further alternative embodiments, the mechanical locking assembly of the present disclosure could be replaced with a digital keypad, biometric scanner, or other known or hereafter-developed quick-unlock assembly or mechanism.

In this embodiment, each of the buttons 130a-130e sits atop a respective one of a plurality of springs 120a-120e that is held within the button housing 104, with the base of each of the springs 120a-120e resting around a respective one of a plurality of spring holders 111a-111e. Each of the springs 120a-120e acts to return a respective one of the buttons 130a-130e to its undepressed position (as shown in, e.g., FIGS. 1 and 8) when the button 130a-130e is released, while allowing each button 130a-130e to be depressed so that a user can attempt to enter the unlock combination of the locking assembly 100. In this embodiment, each of buttons 130a-130e comprises a pair of pin holes, which include internal threading therein to allow the locking pins 164a-164e to be selectively attached to the buttons 130a-130e to select or change the unlock combination of the locking assembly 100. In this embodiment, each of the locking pins 164a-164e has a threaded portion and a head (for ease of illustration, only threaded portion 166 and head 168 of locking pin 164a are labeled in the Figures). As shown in the Figures, each of buttons 130a-130e includes an upper pin hole 132a-132e—which is designed to receive a respective one of the locking pins 164a-164e if that button 132a-132e it is to be included in the unlock combination of the locking assembly 100—and a lower pin hole 134a-134e—which is designed to receive a respective one of the locking pins 164a-164e if that button 132a-132e it is to be excluded from the unlock combination 100.

As indicated above, the user sets an unlock combination by installing the one or more locking pins 164a-164e that will be included in the desired unlock combination into the respective one or more of the upper pin holes 132a-132e, and installing the one or more locking pins 164a-164e that will be excluded from the desired unlock combination into the respective one or more of the lower pin holes 134a-134e. As noted above, in this embodiment the locking pins 164a-164e are threadedly engaged within the buttons 130a-130e, but in alternative embodiments the locking pins 164a-164e may be removably engageable with the buttons 130a-130e in any number of different ways, for example a pressure fit or snap fit. As shown in the Figures, the selected unlock combination for the locking assembly 100 is set for "1-3-5," meaning that buttons number 1 (button 130a), 3 (button 130c), and 5 (button 130e) must be simultaneously depressed to release the top lid 14 from the bottom lid 50. As will be explained below, with this unlock combination set, the buttons 130a,130c,130e must be simultaneously depressed without simultaneous depression of either of button number 2 (button 130b) or button number 4 (button 130d) in order for the locking assembly 100 to act to disengage the top lid 14 from the bottom lid 50. In this embodiment, the outer housing 170 includes a plurality of grooves 182a-182e into which each of a respective one of the buttons 130a-130e is fitted, such that each of the buttons 130a-130e is only permitted to move upwardly and downwardly (i.e., parallel with the center axis of each of the springs 120a-120e) within the locking assembly 100, and is unable to shift in any lateral direction (including the directions 2,4 shown in FIGS. 9 and 10). The outer housing 170 also includes a window 172 through which the rear sides of the buttons 130a-130e and the lock fasteners 164a-164e are visible when the locking assembly 100 is fully assembled, thus allowing for the unlock combination to be changed while the storage box 10 is open without any need for disassembly of the locking assembly 100.

As noted above, the locking plate 26 is affixed to the underside of the top lid 14 via the fasteners 30a-30c, which are routed through the holes 28a-28c in the locking plate 26. The holes have an elongated, oval shape to allow for lateral shifting of the locking plate 26. As further noted above, the spring 42 acts to bias the locking plate 26 in a direction to the left (i.e., direction 2) as shown in FIGS. 9 and 10. The pin plate 140 includes a bore 148 in which one end of a spring 150 is held, the other end of the spring 150 being held in place by a tab 174 located on the outer housing 170. The spring 150 acts to bias the pin plate 140 in a direction to the right (i.e., in a direction 4) as shown in FIGS. 9 and 10.

In this embodiment, the locking plate 26 includes locking tab 34 and locking tab 36, and pin plate 140 includes locking tab 142 and locking tab 144. In a default configuration (i.e., when the locking assembly is not being properly opened or manually overrode), locking tab 34 of locking plate 26 sits underneath locking tab 142 of pin plate 140, and locking tab 36 of locking plate 26 sits underneath locking tab 144 of pin plate 140 without lateral shifting of either of the locking plate 26 or the pin plate 140, thus preventing the top lid 14 from being separated from the bottom lid 50 and denying the user access to the storage compartment 56. When the manual override feature is being used, the biasing forces of the springs 42,150 can be overcome by the user by pulling the locking plate 26 to the right (i.e., in direction 4) and the pin plate 140 to the left (i.e., in direction 2) in the frame of reference as shown in FIGS. 9 and 10. In standard situations, however, the user will not desire to leave the override keys 8a,8b accessible, to prevent undesired access to the storage compartment 56. Further, in alternative embodiments, the storage box 10 may be provided without any override capability for the locking assembly 100.

As indicated above, the locking assembly 100 is opened—thus allowing access to the storage compartment 56—by lateral shifting of the pin plate 140 (to the left—i.e., in direction 2—as shown in FIGS. 9 and 10) to a sufficient degree to free the locking tabs 34,36 of the locking plate 26 from being located underneath the locking tabs 142,144 of the pin plate 140.

In this embodiment, each of the upper pin slots 152a-152e has a lateral portion and a diagonal portion (for ease of illustration, only lateral portion 154 and diagonal portion 156 of upper pin slot 152a are labeled in the Figures), and each of the lower pin slots 158a-158e has a lateral portion and a diagonal portion (for ease of illustration, only lateral portion 160 and diagonal portion 162 of lower pin slot 158a are labeled in the Figures). In this embodiment, each of the lateral portions (e.g., lateral portions 154,160) are oriented parallel to the directions 2,4 in which the pin plate 140 is permitted to move, and each of the diagonal portions (e.g., diagonal portions 156,162) are not oriented parallel to the directions 2,4 in which the pin plate is permitted to move. Each of a respective one of the plurality of dividers 109a-109e is partially aligned with the path of the diagonal portion (e.g., diagonal portion 156) of each of the respective upper pin slots 152a-152e, but no portion of any of the dividers 109a-109e is aligned with the path of the diagonal portion (e.g., diagonal portion 162) of any of the respective lower pin slots 158a-158e. Therefore, when one of the buttons 130a-130e is depressed that is included in the unlock combination, the respective one of the locking pins 164a-164e will move downwardly within the respective diagonal portion (e.g., diagonal portion 156) of the respective upper pin slot 152a-152e and press into the respective one of the dividers 109a-109e. In contrast, when one of the buttons 130a-130e is depressed that is excluded from the unlock combination, the respective one of the locking pins 164a-164e will move downwardly within the respective diagonal portion (e.g., diagonal portion 162) of the respective lower pin slot 158a-158e and not make contact with the respective one of the dividers 109a-109e.

If all of the one or more buttons 130a-130e that are included in the unlock combination are depressed simultaneously and to a sufficient depth (in direction 6, see FIGS. 5, 9, and 10) without any of the one or more buttons 130a-130e that are excluded from the unlock combination being simultaneously depressed, the one or more of the locking pins 164a-164e associated with the respective one or more of the buttons 130a-130e that are included in the unlock combination (e.g., locking pins 164a,164c,164e in the example shown in the Figures) will move downwardly within the diagonal portion(s) of the respective upper pin slots 152a-152e and thereby act to apply pressure against the pin plate 140 such that it shifts in direction 2 (see FIGS. 9 and 10) a sufficient distance—in the process temporarily overcoming the restorative force of spring 150—such that the locking tabs 142,144 of the pin plate 140 are relocated from a position atop the respective locking tabs 34,36 of the locking plate 26, thus allowing the top lid 14 to be removed from the bottom lid 50 and granting access to the storage compartment 56. In this scenario, the one or more of the locking pins 164a-164e that is excluded from the unlock combination (e.g., locking pins 164b,164d in the example shown in the Figures) remains vertically aligned with and will slide horizontally within the lateral portions (e.g., lateral portion 160) of the respective lower pin slots 158a-158e. In this embodiment, the lateral portions of the lower pin slots 158a-158e are elongated and not at all aligned with any of the dividers 109a-109e, allowing the one or more of the locking pins 164a-164e that is excluded from the unlock combination (e.g., locking pins 164b,164d in the example shown in the Figures) to freely move within the lateral portion of the respective lower pin slots 158a-158e without impeding on the lateral movement of the pin plate 140 in direction 2. As will be further explained below, this is the only combination of movements that will result in unlocking of the locking assembly 100. In this embodiment, the direction 6 of depression of the buttons 130a-130e is perpendicular to each of the directions 2,4 in which the pin plate 140 is able to shift.

If one or more buttons 130a-130e that are included in the unlock combination are not depressed as part of an attempt to unlock the locking assembly 100, the one or more of the locking pins 164a-164e associated with the respective one or more of the undepressed buttons 130a-130e that are included in the unlock combination (e.g., one or more of locking pins 164a,164c,164e in the example shown in the Figures) remains vertically aligned with and will slide horizontally within the lateral portions (e.g., lateral portion 154) of the respective upper pin slots 152a-152e. In this embodiment, the lateral portions of the lower pin slots 158a-158e are short and intersect with the edges of the dividers 109a-109e. Thus, the one or more of the locking pins 164a-164e (e.g., one or more of locking pins 164a, 164c,164e in the example shown in the Figures) that is included in the unlock combination but associated with an undepressed button will contact the respective one or more of the dividers 109a-109e, thus impeding the lateral movement of the pin plate 140 in direction 2 and preventing unlocking of the locking assembly 100.

If all of the one or more buttons 130a-130e that are included in the unlock combination are depressed simultaneously and to a sufficient depth, but one or more of the buttons 130a-130e that is excluded from the unlock combination is also simultaneously depressed, the one or more of the locking pins 164a-164e associated with the respective one or more of the buttons 130a-130e that is excluded from the unlock combination (e.g., locking pins 164b,164d in the example shown in the Figures) will move downwardly within the diagonal portion(s) of the respective lower pin slots 158a-158e. Since the diagonal portions (e.g., diagonal portion 162) of the lower pin slots 158a-158e are relatively short, even if the one or more of the buttons 130a-130e that is excluded from the unlock combination is fully depressed, the respective one or more of the locking pins 164a-164e associated with the excluded one or more of the buttons 130a-130e will be located such that adequate shifting of the pin plate 140 a sufficient distance in direction 2 (see FIGS. 9 and 10) such that the locking tabs 142,144 of the pin plate 140 are relocated from a position atop the respective locking tabs 34,36 of the locking plate 26 is not possible, thus preventing removal of the top lid 14 from the bottom lid 50 and denying access to the storage compartment 56.

In the present embodiment, the locking assembly 100 can be actuated with either hand (ambidextrously) or with both hands simultaneously. In alternative embodiments in which more than five buttons are used as part of the locking assembly, the locking assembly may require the use of both hands simultaneously. Further, in the present embodiment each of the buttons 130a-130e (see, for example, FIGS. 7 and 8) includes grooves (not separately labeled) located on its upper, finger-contact surfaces, which aid the user in locating the buttons 130a-130e in dark environments and assist with button grip during the button-actuation process. In alternative embodiments, these surfaces of the buttons may be provided with different texturing or indicators, including unique texturing or indicators for each button. For example, standard Braille symbols, raised or depressed dots or grooves, or other unique indicators could be used for each separate button, which could assist a user in quickly identifying the proper hand position in dark environments, thus reducing the likelihood of mis-entry of the unlock combination.

Although exemplary implementations of the herein described apparatus(es), system(s), and/or method(s) have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. An enclosure, the enclosure comprising:
   a main body;
   a lid; and
   a locking assembly that is releasably engageable between the main body and the lid, the locking assembly having a locked configuration in which the lid and the main body are secured together and an unlocked configuration in which the lid is separable from the main body, the main body and the lid forming a storage compartment therebetween when the main body and the lid are mated together, the locking assembly comprising
   a plurality of buttons, each of the plurality of buttons being individually depressible, each of the plurality of buttons being individually includable or excludable from an unlock combination of the locking assembly, wherein all of the buttons of the plurality of buttons which are included in the unlock combination must be simultaneously depressed without any of the buttons of the plurality of buttons which are excluded from the unlock combination being simultaneously depressed to place the locking assembly into the unlocked configuration.

2. The enclosure of claim 1, the enclosure further comprising an electrical passthrough that extends from an exterior of the enclosure into the storage compartment.

3. The enclosure of claim 2, wherein the electrical passthrough comprises a charging and/or data port.

4. The enclosure of claim 3, wherein the charging and/or data port is a first port arranged on the exterior of the enclosure, and
   wherein the electrical passthrough further comprises a second port located within the storage compartment, the second port being in electrical communication with the first port.

5. The enclosure of claim 1, further comprising a gasket located between and in contact with both of the main body and the lid when the main body and the lid are mated together, the gasket surrounding a perimeter of the storage compartment and rendering the storage compartment liquid-proof when the main body and the lid are mated together.

6. The enclosure of claim 5, the storage compartment further comprising a liquid-impermeable but gas-permeable sealing vent provided through a surface thereof.

7. The enclosure of claim 5, further comprising at least one lid release pin that is in contact with at least one lid release spring, the at least one lid release spring acting to bias the at least one lid release pin to bias the lid away from the main body.

8. The enclosure of claim 5, wherein the gasket extends around the entirety of the perimeter of the storage compartment.

9. The enclosure of claim 1, further comprising at least one locking hole that extends through each of the main body and the lid, the at least one locking hole being adapted to receive a secondary lock therethrough.

10. The enclosure of claim 1, further comprising at least one light located within the storage compartment.

11. The enclosure of claim 1, further comprising a wireless charger located inside the enclosure.

12. An enclosure, the enclosure comprising:
   a main body;
   a lid; and
   a locking assembly that is releasably engageable between the main body and the lid, the locking assembly comprising
   a plurality of buttons, each of the plurality of buttons having a first pin hole and a second pin hole, each of the plurality of buttons being individually depressible,
   a plurality of locking pins, each of the plurality of locking pins being selectably installable in either of the first pin hole or the second pin hole of a respective one of the buttons of the plurality of buttons, wherein installation of a respective one of the locking pins into the respective first pin hole of a respective one of the buttons includes said button in an unlock combination of the locking assembly and wherein installation of said respective one of the locking pins into the respective second pin hole of said respective one of the buttons excludes said button from the unlock combination, a pin plate comprising a plurality of upper pin slots and a plurality of lower pin slots, each of the upper pin slots corresponding with a location of a respective first pin hole of a button of the plurality of buttons and each of the lower pin slots corresponding with a location of a respective second pin hole of a button of the plurality of buttons, wherein when all of the buttons of the plurality of buttons which are included in the unlock combination are simultaneously depressed without any of the buttons of the plurality of buttons which are excluded from the unlock combination being simultaneously depressed, the plurality of locking pins press on the pin plate and cause it to be temporarily relocated such that the lid is separable from the main body.

13. The enclosure of claim 12, the pin plate further comprising at least one locking tab, the enclosure further comprising a locking plate attached to the lid, the locking plate comprising at least one locking tab that interacts with the at least one locking tab of the pin plate when the locking assembly is in a locked configuration to prevent separation of the lid from the main body.

14. The enclosure of claim 13, wherein at least a portion of the at least one locking tab of the pin plate is positioned atop at least a portion of the at least one locking tab of the locking plate when the locking assembly is in its locked configuration.

15. The enclosure of claim 12, wherein the pin plate is temporarily relocated in a first direction when all of the buttons of the plurality of buttons which are included in the unlock combination are simultaneously depressed without any of the buttons of the plurality of buttons which are excluded from the unlock combination being simultaneously depressed, the locking assembly further comprising a spring that biases the pin plate in a second direction when none of the buttons of the plurality of buttons are being depressed, the second direction being opposite the first direction.

16. The enclosure of claim 15, wherein each of the buttons of the plurality of buttons is depressible in a third direction, and the third direction is perpendicular to each of the first direction and the second direction.

17. The enclosure of claim 15, wherein each of the plurality of upper pin slots comprises a lateral portion and a diagonal portion and each of the lower pin slots comprises a lateral portion and a diagonal portion, wherein each of the lateral portions is oriented parallel to the first and second directions and each of the diagonal portions is not oriented parallel to the first and second directions.

18. The enclosure of claim 12, further comprising a gasket located between and in contact with both of the main body and the lid when the main body and the lid are mated together, the gasket providing a liquidproof seal.

19. The enclosure of claim 12, wherein each of the locking pins of the plurality of locking pins is threadedly installable into and threadedly removable from the first pin hole and the second pin hole of a respective button of the plurality of buttons.

20. An enclosure, the enclosure comprising:
a main body;
a lid; and
a locking assembly that is releasably engageable between the main body and the lid, the locking assembly comprising
a pin plate comprising a plurality of slots,
a plurality of buttons, each of the plurality of buttons being individually depressible in a first direction, wherein a subgroup of one or more buttons of the plurality of buttons are included in an unlock combination,
a plurality of pins, each of the plurality of pins being extendable from each of the plurality of buttons to engage a corresponding slot of the plurality of slots in the pin plate,
wherein when the one or more buttons of the subgroup are depressed without depressing any of the one or more of the plurality of buttons which are excluded from the subgroup, the pin extending from each of the subgroup of buttons engages the corresponding slot in the pin plate such that the pin plate shifts in a second direction that is different from the first direction to release the lid from the main body.

21. The enclosure of claim 20, wherein the pin extending from each of the plurality of buttons can be arranged in either a first location or a second location,
wherein the pin is arranged in the first location, the respective button is included in the subgroup, and
wherein when the pin is arranged in the second location, the respective button is excluded from the subgroup.

22. The enclosure of claim 20, wherein the second direction is perpendicular to the first direction.

* * * * *